United States Patent [19]
Hurlbert

[11] 3,776,190
[45] Dec. 4, 1973

[54] ATTACHMENT TYPE RABBIT FEEDER
[76] Inventor: Lawrence Hurlbert, P. O. Box 818, Sandpoint, Idaho 83864
[22] Filed: Jan. 30, 1973
[21] Appl. No.: 327,912

[52] U.S. Cl. ................................................ 119/18
[51] Int. Cl. ........................................... A01k 31/06
[58] Field of Search ....................................... 119/18

[56] References Cited
UNITED STATES PATENTS

| | | | |
|---|---|---|---|
| 2,066,264 | 12/1936 | Fisher | 119/18 X |
| 175,133 | 7/1955 | Siggins | 119/18 X |
| 3,185,133 | 5/1965 | Bird | 119/18 |
| 3,418,974 | 12/1968 | Reeves | 119/18 |

Primary Examiner—Louis G. Mancene
Assistant Examiner—J. A. Oliff
Attorney—Richard C. Sughrue et al.

[57] ABSTRACT

An attachment type rabbit feeder is generally trapezoidal in vertical elevation and is provided with a front projecting feed portion which conforms to and projects through an opening in a rabbit cage, the projection creating an offset, upper front wall coplanar with and external of the cage and a lower front wall within the cage. A Z-shaped separator baffle in one form of the feeder, separates the feeder into front and rear chutes cooperating with the upper and lower front walls and the unbroken side and rear walls. The projection of the side walls forms in conjunction with the upper and lower front walls, an open top feed opening. A first screen member extends horizontally from the lower front wall intermediate the top and the bottom edges thereof to the separator wall and defines an upper feed bin permitting the more mature rabbits to feed therefrom. the rear wall terminates at its bottom coplanar with the upper front wall, and a second screen member extends horizontally from the bottom edge of the lower front wall to the rear wall to define a lower feed bin. A plurality of laterally spaced circular openings permit access to the lower feed bin and permit feeding by the less mature rabbits therefrom. A pivotable selector gate mounted at the top of the feeder and pivoting about an axis extending between the side walls and in line with the upper end of the separator baffle shields one of the chutes and facilitates access to the other chute to facilitate filling of the chutes and associated feed bins. Wire hooks extending through the upper side walls of the feeder cooperate with a lip at the bottom of the rear wall to readily permit attachment of the feeder to the cage with the feed bins projecting into the cage interior. In a second embodiment, a "creep" feeder consisting essentially of the lower half of the two-part feeder and attaches to the cage below an existing "doe" feeder and a pivotable gate at the top of its chute moves into inclined guide position to facilitate filling of the chute and underlying feed bin.

14 Claims, 6 Drawing Figures

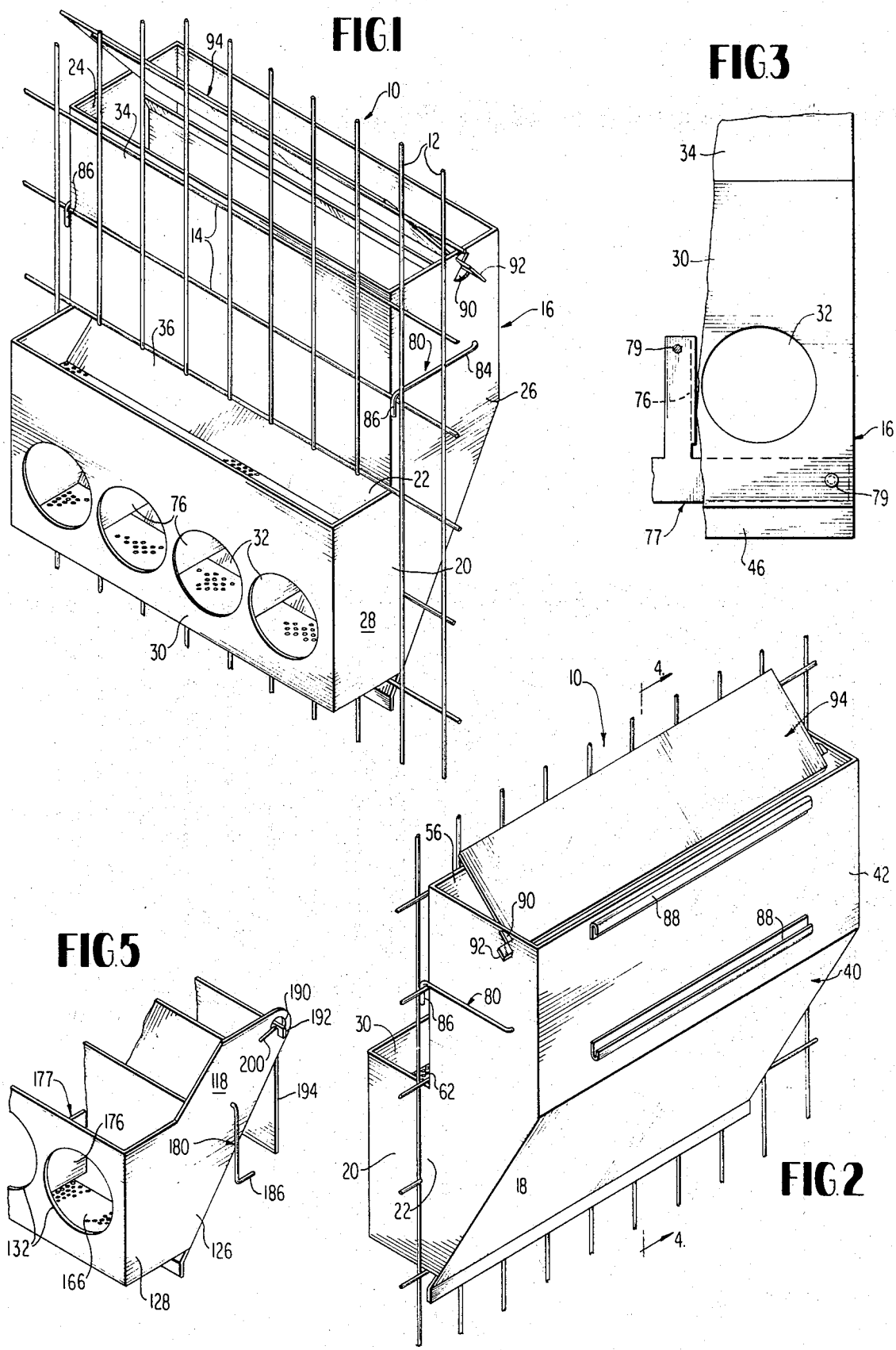

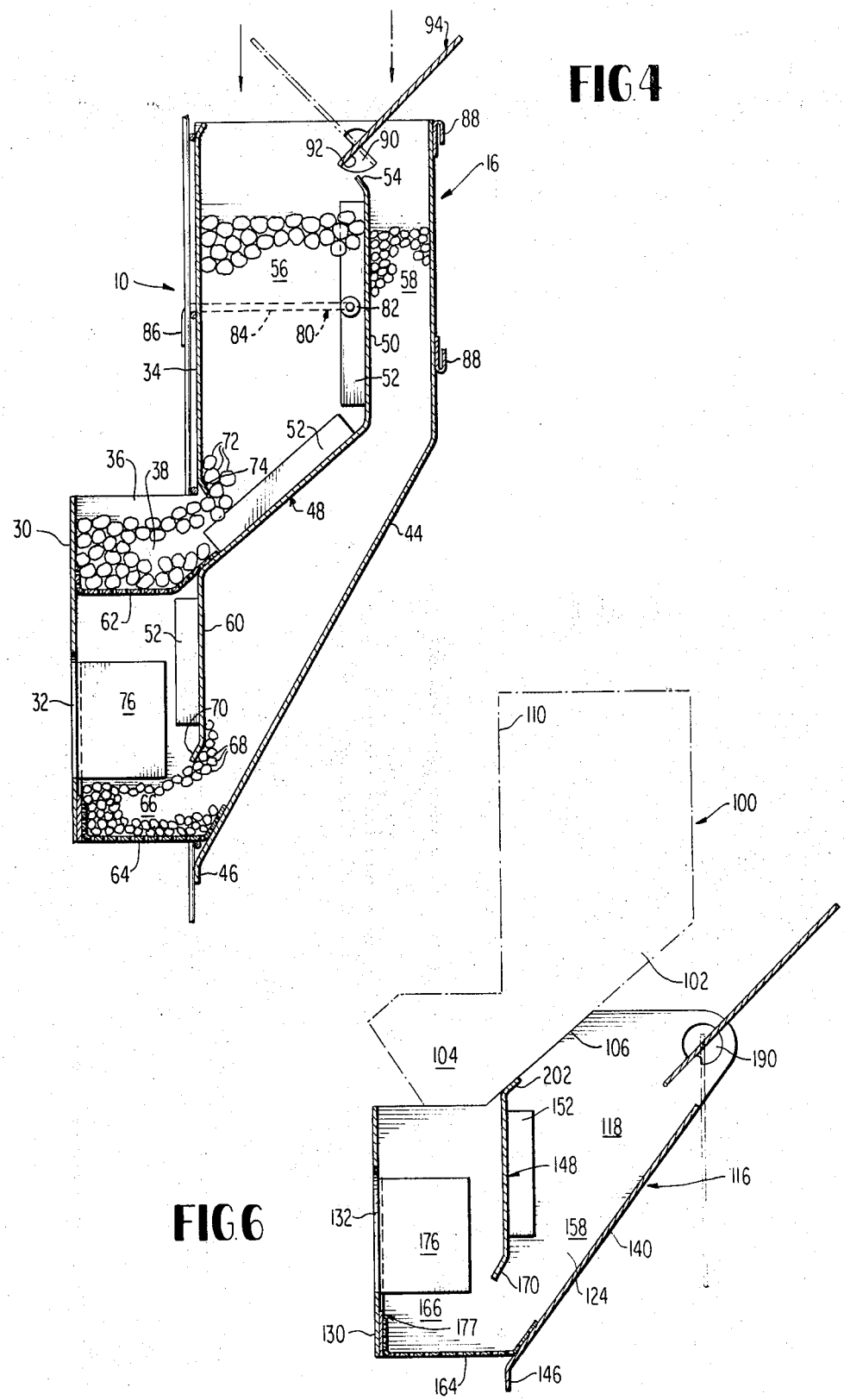

ATTACHMENT TYPE RABBIT FEEDER

BACKGROUND OF THE INVENTION

FIELD OF THE INVENTION

This invention relates to rabbit feeders, and, more particularly, to a "creep" feeder or a combined "creep" and "doe" feeder which is stably and securely attached to the rabbit cage with the feed bin portion projecting through an opening within the same.

Conventionally, rabbit cages are constructed of wire screen formed by intersecting vertical and horizontal wires and defining rectangular openings of given dimensions. Feeding of the rabbits within the cage is achieved principally through the use of a feeding device which is generally trapezoidal in vertical elevation and includes a forward projecting portion at the bottom of the same defining a V-shaped feed bin permitting the open top of the projection which sits within a rectangular cut-out of one of the cage side walls to project internally of the cage. Feed is poured into the open top of the feeder and permitted to flow downwardly in the chute formed by the unbroken side walls, front wall and rear wall. The bottom of the rear wall normally tapers downwardly and inwardly to effect delivery of the food in pellet form or the like to the front of the projecting bin portion and generally filling the bin to the level defined by the upper front wall of the feeder. Such feeders are useful in feeding only mature or semi-mature rabbits known as "does" since the rabbits must be able to reach the food through the open slot at the top of inwardly projecting bin portion of the feeder. In order to feed the newly born rabbits known as "creepers", it is conventional to provide within the cage another feeder of generally closed box form which rests on the bottom of the cage, and which is totally within the cage, the creeper rabbits reaching the food carrier therein through a plurality of circular holes in the front wall of the same. The creeper feeder is not normally used by commercial raisers since it fits inside the cage using up valuable cage floor space. Also, in order to fill the feeder, such feeders conventionally employ a one inch wide trough which pulls out selectively into the aisle for filling, but because of its limited width, feed is often spilled onto the floor.

SUMMARY OF THE INVENTION

The present invention is directed to a rabbit feeder of the cage attachment type which does not take up any floor space, which permits the selective feeding of both creepers and does, that is, the newly born rabbits and the more mature rabbits, which is stable and readily attached to the cage and which permits powdered food to drop from both the upper and lower feed bins in a dual feed arrangement. The device of this invention carries means for selecting a bin to be loaded with the pelletized rabbit food, and prevents the non-selected feed bin from inadvertently receiving the wrong type of pelletized rabbit food, while facilitating feed supply to the desired bin through the selected chute leading to the same. In another form, the feeder constitutes an attachment to an existing "doe" feeder which transforms the "doe" feeder into a dual feed arrangement and wherein the attachment includes means for facilitating the delivery of food to the creep feed area regardless of the presence of the doe feeder immediately above the same.

Specifically, the rabbit feeder in one form which is of the cage attachment type for external attachment to a wire screen wall of a rabbit cage, with a bin portion of the feeder projecting through a conforming opening within the wire screen wall, has the feeder formed of spaced planar side walls of generally trapezoidal configuration in elevation with a rectangular feed portion projecting therefrom and through the wire screen wall opening. An integral, vertically elongated trough or chute portion extends from the feed portion adjacent to and along the outside of the screen, above the opening. An upper imperforate front wall connects the side walls and lies adjacent to the wire screen wall of the rabbit cage externally of the same. A lower imperforate front wall joins the inner vertical edges of the projecting bin portion of the side walls and extends the length of the same to define with the upper front wall, an upper "doe" feed opening. An imperforate rear wall extends the length of the side wall and joins the same with the lower portion of the imperforate rear wall tapering inwardly and including a short lip extending below and beyond the side wall feed portions, coplanar with the upper front wall. An imperforate separator wall extends between the side walls and intermediate the front and rear walls and defines front and rear troughs or chutes. An upper screen member extends horizontally between the lower front wall, intermediate of its top and bottom, and the separator and below the upper feed opening, to form with said side walls an upper feed bin. A second screen member extends coplanar with the first screen member, between the lower front wall at its bottom edge thereof and the rear wall above the lip to define with the spaced side walls a lower feed bin. At least one circular opening is provided within the lower front wall intermediate of the screens to form a lower feed opening. Preferably, a plurality of side-by-side openings are formed within the lower front wall to define multiple feed openings for the creeper rabbits and vertical baffles extend between the openings to prevent the creeper rabbits from entering the lower feed bin. The separator wall is generally Z-shaped in vertical section including one vertical leg extending coplanar with the upper front wall and said lip and spaced both from the lip and the upper front wall with the rear edge of the first screen member affixed to the upper edge of said one leg and the rear edge of the second screen member being affixed to the lower edge of the said one leg. The top of the feeder defined by the upper front wall, the rear wall, and the side wall, is open to permit filling of the front and rear troughs or chutes, and a pivotable planar selector gate is mounted for pivoting about a horizontal axis extending between the side plates and generally aligned with the upper edge of the separator wall, the height of the selector gate being such as to generally overlie one of the troughs when inclined in a first direction permitting the guiding or delivery of food to the other of said troughs and vice versa when inclined in the opposite direction. Opposed aligned hourglass openings define the pivot axis and the selector gate includes at each lateral edge a projection within its opening. The openings define the angle of inclination of said selector gate relative to each side thereof. Paired hooks on each side of the feeder terminate in bent ends which hook over a horizontal wire of the cage wall above the opening receiving the feeder projection and cooperate with the lip extending downwardly from the rear wall to securely locate the feeder on the cage wall.

In another form, the feeder takes the form of a "creep" feeder attached to the cage wall below an existing "doe" feeder and consists of a trapezoidal assembly in vertical elevation having a projecting bin portion which extends within an opening formed within a cage wall. The creep feeder attachment fits immediately beneath the existing feeder with the rectangular forward projecting portion defining a single feed bin within and below the feed bin of the existing "doe" feeder. A vertical front wall extends between spaced side walls and carries at least one opening therein permitting access to the interior of the feed bin, a separator wall extends vertically, intermediate of the front wall and an inwardly inclined rear wall between the side walls, having its bottom edge terminating short of the rear wall and in line with a lip at the bottom end of the rear wall that contacts the screen cage wall. A screen member extends horizontally between the side walls and from the lower edge of the front wall to the rear wall just above the lip to hold the pelletized food but permits powdered residue to drop therefrom. The separator wall and the rear wall define a trough or supply chute permitting the level of food within the feed bin to be maintained generally at or near the height of the openings within the front wall of the feeder. Aligned circular openings at the upper rear corners of respective side walls receive projections from a planar gate and a downwardly and forwardly inclined slot extending radially from the circular opening generally parallel with the rear wall permits the gate to be both rotated and the projections to fall within the slot to lock the gate in an upwardly and rearwardly inclined position to facilitate the filling of the feeder through the chute or trough.

BRIEF DESCRIPTION OF THE DRAWINGS

The present invention will be more fully understood from the following detailed description of the invention with respect to preferred embodiments thereof, when read in conjunction with the accompanying drawings:

FIG. 1 is a front, top, oblique perspective view of a dual rabbit feeder forming one embodiment of the present invention as attached to a rabbit cage.

FIG. 2 is a rear, top, oblique perspective view of the feeder illustrated in FIG. 1.

FIG. 3 is a cut-away, front elevational view of a portion of the feeder illustrated in FIGS. 1 and 2.

FIG. 4 is a sectional elevational view of the feeder illustrated in FIGS. 1, 2 and 3.

FIG. 5 is a fragmentary view of a "creep" feeder forming a second embodiment of the present invention in non-attached position.

FIG. 6 is an elevational view in section of the "creep" feeder of FIG. 5 attached to a rabbit cage just beneath an existing "doe" feeder illustrated in dotted line fashion.

DESCRIPTION OF THE PREFERRED EMBODIMENTS

Referring to FIGS. 1-4 inclusive, there is illustrated an improved cage attachment type rabbit feeder of the present invention in one form which is of the dual feed bin variety permitting selectively the supply and feeding of either creeper rabbits shortly after birth and of the most immature size, or alternatively the somewhat more mature size rabbits known as "does". Essentially, the feeder in both embodiments is of the type permitting ready attachment to an existing wire screen rabbit cage, of which, in FIG. 1, only the wire screen wall 10 is illustrated, consisting of spaced vertical and horizontal crossed wires 12 and 14. In this respect, the feeder, indicated generally at 16, is attached externally of the cage and is generally trapezoidal in side elevation, but is provided with an integral feed bin portion 20 which projects inwardly of the cage through a formed opening 22 consisting of a rectangular cut-out of a size generally on the order of the rectangular feed bin portion 20. In this respect, the feeder 16 comprises spaced planar side walls 24 and 26 including a rectangular forward projecting bin portion 28 which projects interiorly of the cage and across which extends a lower front wall 30 which is imperforate with the exception of a plurality of circular "creep" feed openings 32 at spaced longitudinal positions. An upper front wall 34 extends across and is coupled to side walls 24 and 26 above the projecting portions 28, with the side walls 24 and 26 and the upper and lower front walls 30 and 34 defining a rectangular "doe" feed opening 36 extending the length of the feeder and permitting access to an upper feed bin identified generally at 38, FIG. 4. A rear wall 40 extends the full height of the feeder 16 and conforms to the trapezoidal shape of the external portion 18 of the feeder; the rear wall including an upper vertical portion 42 and an intermediate inwardly and downwardly directed portion 44 which terminates in a lower vertical lip 46 which is coplanar with the upper front wall 34 and extends below the plane of the bottom edge of the lower front wall 30. Within the feeder 16, there is a separator wall 48 which is Z-shaped in vertical cross section, and which is provided with an upper vertical wall portion 50 extending from side wall 24 to side wall 26 and fixed thereto by right angle flanges 52 by welding, riveting, etc. The vertical wall portion 50 terminates in a forwardly directed lip 54 which defines with the upper front wall 34 and the vertical rear wall portion 42, a front feed chute 56 and a rear feed chute 58. The lower vertical leg 60 of the separator wall 48 extends parallel to the lower front wall 30, but is spaced some distance below the bottom of the upper front wall 34 and terminates short of the rear wall 40, although the vertical lower leg 60 is in line with lip 46 of the rear wall and the upper front wall 34 is coplanar in like manner to the other portions of the separator wall. Flanges 52 permit the fixing and the rigid coupling of the separator wall to respective side walls of the feeder 16. Extending horizontally from the lower front panel 30 to the separator wall 48 is an upper perforated metal screen member 62 which also extends the length of the feeder 16 from side wall 24 to side wall 26, the screen being readily affixed by rivets or like means to the imperforate walls of the feeder and defining the upper feed bin 38. In this respect, the upper screen member 62 terminates at the upper edge of the lower leg 60 of the Z-shaped separator wall 48, while the front edge of the same is affixed to the lower front wall 30 intermediate of the top and bottom edges of the same. In like fashion, a lower metal screen member 64 has its front edge fixed to the bottom edge of lower front wall 30 and its rear edge fixed to the rear wall 40 and specifically at the bottom of the inclined wall portion 44 just above lip 46. Thus, in conjunction with the side walls 24 and 26, the lower front wall 30 and the rear wall 40, a lower feed bin 66 is thereby formed, the height of the small pellets 68 filling the same, being defined by the openings 32 and the inclined lip 70 of lower leg 60 of the Z-shaped separator wall 48. The larger sized pellets 72 fill chute 56 and reach a level within the upper feed bin defined principally by the turned lip 74 at the bottom of the upper front wall 34.

In order to prevent the creeper rabbits from actually entering the lower feed bin which, incidentally, is spaced slightly above the floor (not shown), of the wire cage, baffles 76 in plate form which are vertically oriented are fixed to the lower front wall 30 intermediate openings 32 and extend within the lower feed bin towards the rear unitary wall thereof terminating inwardly of the separator wall 48. As seen in FIG. 3, baffles 76 constitute right angle projections from strip 77 which is riveted at multiple locations to lower front wall 30 as at 79.

In order to permit ready attachment and achieve a relatively stable coupling of the dual size rabbit feeder 16 to the rabbit cage 10, the feeder of the present invention makes use of wire hook members 80, each having a leg 84 terminating interiorly with a riveted wafer 82. Each leg 84, in turn, terminates in a hook end 86, which hooks over a given horizontal wire 14 depending on the mesh size of the cage screening forming the wall 10. In this respect, aligned holes are drilled within the side walls 24 and 26 of the feeder at positions somewhat above lip 46 and the hook members cooperate with the lip 46 to fix the feeder 16 as an attachment to the cage, with the feeder bin 20 projecting internally of the cage and with the trapezoidal supply portion 18 lying generally externally of the same. Preferably, oppositely oriented U-shaped channel members 88 are riveted or otherwise affixed to the vertical portion 42 of the rear wall 40 in vertically spaced fashion to permit the insertion of a card (not shown) carrying information relative to the rabbits within the cage.

An important aspect of the present invention resides in the employment of a selector gate 94 which facilitates loading of the small size food pellets 68 within chute 58 filling the lower feed bin 66 for the creeper sized rabbits and/or the large size food pellets 72 filling the front chute 56 and loading the upper feed bin 38. In this respect, the side walls 24 and 26 of the feeder each carry horizontally aligned hourglass openings or cutouts 90 within which are received rectangular projections 92 extending outwardly from the side edges of the rectangular plate like selector gate 94, the height of the gate 94 being such that when it is inclined in the full line position shown in FIG. 4, it tends to completely overlie that portion of the open top of the feeder in vertical alignment with chute 58, while when it is oppositely inclined as illustrated in dotted line fashion in the same figure, and as further illustrated in solid line fashion in both FIGS. 1 and 5, and limited to that extent by the hourglass slot or opening 90, feed emanating from a bag or other container (not shown) in the form of small size pellets 68 may be readily directed into the rear chute 58 supplying the lower feed bin 66, without spillage.

Referring next to FIGS. 5 and 6, there is illustrated a creep feeder attachment forming a second embodiment of the present invention, which is constructed in similar fashion to the bottom half of the feeder 16 illustrated in FIGS. 1–4 inclusive and mounts in the same fashion to the rabbit wire cage externally of the same with a bin projecting through a rectangular opening within the cage wall and lying just beneath a conventional "doe" feeder illustrated in dotted line form in broken lines at 100 in FIG. 6. In this respect, the existing doe feeder 100 has a configuration in vertical elevation external of the cage, which is trapezoidal as at 102 and a projecting bin portion 104 which projects internally of the cage through a portion of a vertical opening within the wire screen forming one vertical side wall of the same. The "creep" feeder illustrated in FIG. 5 and FIG. 6 and identified generally as 116 underlies the conventional doe feeder 100 and consists of spaced, planar imperforate side walls 124 and 126 including a rectangular forward projecting bin portion 128 which projects interiorly of the cage and which is integral with a modified, trapezoidal rear section 118 which defines the chute or supply area to the bin portion 128. Across, fixed to and extending between side walls 124 and 126, is an imperforate front wall 130 which carries a plurality of circular creep feed openings 132 at spaced longitudinal positions, of a size permitting a "creeper" rabbit to feed within a bin area 166 interiorly of the feeder 116. There is no doe feeder portion to this feeder 116, the doe feeder constituting as mentioned previously a completely separate unit as at 100, which is fixed to the outside of the same cage wall as the creeper feeder 116 in this embodiment of the present invention and takes the place of the upper feed bin of the dual unit of FIGS. 1–4 inclusive. The rear wall 140 extends between the side walls 124 and 126, and is inclined terminating at its lower end in a vertical lip 146 which contacts the exterior of the wire cage side wall. Intermediate of the front wall 130 and the rear wall 140, there is provided a vertically positioned separator wall 148 which is affixed to side walls 124 and 126 respectively by means of flanges 152 which may be riveted, welded or otherwise attached to fixedly secure the separator in wall 148 in position intermediate, that is, spaced between the front wall 130 and the rear wall 140. The lower edge of the separator wall 148 is bent slightly at 170 and terminates some distance above lip 146, so as to define an opening permitting small pellet creeper feed (not shown) to enter the creeper bin area 166 to height determined by the bent edge 170 of the separator wall and the multiple creeper feed access openings 132. An oppositely directed lip 202 at the upper edge of separator wall 148 contacts the sloping rear wall 106 of the conventional doe feeder 100 to facilitate the attachment and location of the creeper feeder 116 in contact with and just beneath the existing doe feeder 100. The attachment to the wire cage occurs in similar manner to that of the prior embodiment, that is, hook members 180 have their sides extending outside of sidewalls 124 and 126, and terminate in right angle ends 186, which lock onto one of the horizontal wires (not shown) making up the wire rabbit cage wall indicated only in dotted line fashion at 110, in broken line fashion at 110, in FIG. 6. In like respect, the lip 146 of rear wall 140 contacts the vertical wires (not shown) making up the sidewall 110 of the cage to insure the maintaining of the feeder in position with the bin 166 projecting internally of the cage in much the same manner as the prior described embodiment. A metal strip member 177 is provided with integral rectangular baffles 176 which extend inwardly of the feed bin 166 intermediate of each of the bin feed openings 132 within the front wall 130, identically to that illustrated in the embodiment of FIGS. 1–4. Further, a wire mesh screen 164 extends across the bottom of bin 166 between the lower edge of the front wall 130 and the bottom of the side wall 140 adjacent to the top of the lip 146, the wire mesh screen 164 being readily attached to these walls and to the side walls by conventional means, such as by soldering, adhesive, screws and the like.

The separator wall 148 acts in conjunction with the inclined rear wall 140 to define the side walls 124 and 126, a feed bin 158 leading to the feed bin 166. In this respect, the side walls 124 and 126 are provided with circular openings 190 within which reside projections 192 of planar gate 194, each of the circular openings 190 having a downwardly and inwardly directed slot 200 extending radially therefrom of a size permitting the projections 192 to ride within the slot in such a manner that by rotating the slot the gate 194 from the broken line position illustrated in FIG. 6 to a position such that it is in alignment with slot 200, it may then be displaced downwardly slightly so as to lock the gate in the full line inclined position shown in FIG. 6, facilitating the adding of creeper sized pellets through a supply chute 158 to the feed bin area 166. When the supply chute 158 is filled, the gate may be returned to the broken line position out of the way and generally in line with the rear wall of the existing doe feeder. The presence of the wire mesh screen 164 permits the powdered residue of the creeper feed to pass therethrough while the pellets are captured within the feed bin 166 until eaten by the creeper rabbits.

In both embodiments, all of the components of the feeder may be constructed of stock sheet metals with the exception of the perforated screens defining the perforated bottom of the feed bins and the wires forming the attachment hook for each embodiment.

What is claimed is:

1. A rabbit feeder of the attachment type for external attachment to a wire screen wall of a rabbit cage with a portion of the feeder projecting through a conforming opening within said cage wall, said feeder comprising:
    spaced planar side walls including a rectangular feed portion projecting through said cage wall opening and an integral, vertically elongated trough portion extending from said feed portion and adjacent the outside of said wire cage, said wire cage wall abutting said opening,
    an upper imperforate front wall connecting said side walls and lying within the plane separating said side wall portions,
    a lower imperforate front wall joining the inner vertical edges of the bin portion of the side walls and extending the length of the same to define an upper feed access opening,
    an imperforate rear wall extending the length of the side walls and joining the same, said rear wall including a lip extending below and beyond said wall feed portions and coplanar with said upper feed wall to locate the bottom of the feeder relative to the cage wall carrying the same,
    an imperforate separator wall extending between said side walls and spaced from the front and rear walls and defining front and rear supply chutes,
    a first upper perforated screen member extending horizontally between the lower front wall and said separator wall and spaced below said top feed opening to form with said side walls an upper feed bin,
    a second perforated screen member extending parallel to said first screen member and between said lower front wall at its bottom edge and said rear wall above said lip and defining with said side walls a lower feed bin, and
    at least one opening within said lower front wall intermediate of said screen members and forming a lower feed opening for permitting immature rabbits to feed from said lower bin.

2. The feeder as claimed in claim 1, wherein a plurality of side-by-side circular openings are formed within said lower front wall and said feeder further comprises a plurality of vertical baffles extending from said lower front wall towards said separator wall and respectively positioned between said openings to prevent said immature rabbits from entering said lower feed bin.

3. The feeder as claimed in claim 1, wherein said separator wall is generally Z-shaped in vertical cross section and includes one leg extending coplanar with said upper front wall and said lip on said rear wall and being spaced therefrom, and wherein the rear edge of said first screen member is affixed to the upper edge of said one vertical leg, and the rear edge of said second screen member is affixed to the lower edge of said one vertical leg.

4. The feeder as claimed in claim 1, wherein said upper front wall, said rear wall and said side walls define an open top for said feeder, and a selector gate of sheet form is pivotably mounted for rotation about an axis extending between said side plates and generally in line with the upper edge of said separator wall, and the height of said gate is such that when pivoted to inclined position, it readily overlies one chute facilitating the supply of feed to the other chute, and vice versa.

5. The feeder as claimed in claim 4, wherein said side walls include aligned hour glass openings to define said selector gate pivot axis, said gate comprises a rectangular metal sheet having projections at each end and fitting within said hour glass openings, and wherein the hour glass configuration defines the angular inclination of said plate to each side from the vertical to facilitate supply of feed to one of said chutes while shielding the other.

6. The feeder as claimed in claim 1 further comprising: wire hooks suitably coupled to respective side walls of said feeder externally of the cage wall and having downwardly bent ends movable to generally coplanar positions with respect to the lip of said rear wall and engageable with a given horizontal wire of the wire cage side wall to securely locate and affix the feeder to the wire screen defining the cage side wall.

7. The feeder as claimed in claim 2, further comprising: wire hooks suitably coupled to respective side walls of said feeder externally of the cage wall and having downwardly bent ends movable to generally coplanar positions with respect to the lip of said rear wall and engageable with a given horizontal wire of the wire cage side wall to securely locate and affix the feeder to the wire screen defining the cage side wall.

8. The feeder as claimed in claim 3, further comprising: wire hooks suitably coupled to respective side walls of said feeder externally of the cage wall and having downwardly bent ends movable to generally coplanar positions with respect to the lip of said rear wall and engageable with a given horizontal wire of the wire cage side wall to securely locate and affix the feeder to the wire screen defining the cage side wall.

9. The feeder as claimed in claim 4, further comprising: wire hooks suitably coupled to respective side walls of said feeder externally of the cage wall and having downwardly bent ends movable to generally coplanar positions with respect to the lip of said rear wall and engageable with a given horizontal wire of the wire cage side wall to securely locate and affix the feeder to the wire screen defining the cage side wall.

10. The feeder as claimed in claim 5, further comprising: wire hooks suitably coupled to respective side walls of said feeder externally of the cage wall and having downwardly bent ends movable to generally coplanar positions with respect to the lip of said rear wall and engageable with a given horizontal wire of the wire cage side wall to securely locate and affix the feeder to the wire screen defining the cage side wall.

11. The feeder as claimed in claim 6, wherein a U-shaped wire extends completely through the feeder from one side wall to the other, with the legs of the U-shaped wire deforming said paired hooks and extending adjacent the outside surface of respective side walls.

12. A rabbit feeder of the attachment type for external attachment to a wire screen wall of a rabbit cage with a portion of the feeder projecting through a conforming opening within said cage wall, said feeder comprising:
  spaced planar side walls including a rectangular feed portion projecting through the cage wall opening and an integral, vertically elongated trough portion extending from said feed portion and adjacent the outside of said wire cage, said wire cage wall abutting said opening, and
  an imperforate front wall joining the vertical inner edges of the bin portion of said side walls and extending the length of the same,
  an imperforate rear wall extending the length of the side walls and joining the same, said rear wall including a lip extending below and beyond said side walls,
  an imperforate separator wall extending between said side walls and spaced from the front and rear walls and defining at least one supply chute, the bottom edge of said separator wall being spaced from said lip,
  a perforated screen member extending horizontally between the lower edge of the front wall and said rear wall, above said lip and forming a feed bin, and
  at least one opening within said front wall above said screen for permitting immature rabbits to feed from said bin.

13. The feeder as claimed in claim 12, wherein a plurality of side-by-side circular openings are formed within said front wall and said feeder further comprises a plurality of vertical baffles extending from the front wall towards said separator wall and respectively positioned between said openings to prevent immature rabbits from entering said feed bin.

14. The feeder as claimed in claim 13, wherein said separator wall, said side walls and said rear wall define an open top for said feeder, and a selector gate of sheet form is pivotably mounted for rotation about an axis extending between said side plates and generally in line with the upper edge of the rear wall, circular aligned openings are provided within respective side walls to define the selector gate pivot axis, said gate comprises a rectangular metal sheet having lateral projections at each lower corner, said projections fitting within said circular openings and said openings including radial slots extending therefrom in a direction towards said bin and generally parallel to the rear wall, whereby: said slots receive said projections to maintain said selector gate at an inclined position wherein said gate acts as an extension of said rear wall to facilitate filling of said feed chute and said underlying feed bin with pelletized food.

* * * * *